United States Patent Office 3,539,663
Patented Nov. 10, 1970

3,539,663
FIBRILLATED FIBERS OF A POLYAMIDE AND A SULFONE POLYESTER
Edward W. Pietrusza, Morristown, Jack R. Pedersen, Parsippany, and Dusan C. Prevorsek, Morristown, N.J., assignors to Allied Chemical Corporation, New York, N.Y., a corporation of New York
No Drawing. Filed Nov. 6, 1967, Ser. No. 681,021
Int. Cl. C08g 41/04
U.S. Cl. 260—857       5 Claims

ABSTRACT OF THE DISCLOSURE

This specification is directed to fibrillated yarns and particularly to novel polymer blends of a polyamide, e.g., nylon 6 or nylon 66, and sulfone polyesters that are capable of being extruded into monofilaments whose composition permits the monofilament structure to be readily fibrillated into a multitude of fibrils while essentially retaining the high tensile strength of the structure. The sulfone polyesters may comprise any of a variety of known compositions; preferably, they comprise the reaction product of an aromatic dihydroxy compound and 4,4'-dichlorocarbonyldiphenyl sulfone. By varying the composition and amount of the polyester blended with the polyamide, the physical properties of the blend, as well as the degree and nature of fibrillation, can be modified for particular applications.

---

Synthetic thermoplastic polymers obtained from polyamides, particularly the condensation product of 1,6-hexamethylene diamine and adipic acid, conventionally referred to as nylon 66, and polycaprolactam, commonly known as nylon 6, are widely used as films, molded articles, and fibers wherein the excellent high-strength properties of the nylons are advantageous. However, for applications where it is desired to separate the monofilament into many strands, it is necessary to modify the mixture from which the filament is spun so that at least two mutually incompatible polymers are present.

It is an object of the present invention to provide novel blends of an aromatic sulfone polyester and a polyamide, such blends being characterized by their advantageously modifiable physical properties.

It is a further object to provide novel blends of aromatic sulfone polyesters and nylon suitable for the preparation of filaments which can be readily separated into many fibrils by conventional fibrillation methods.

A further object of this invention is to provide fiber-forming compositions of nylon and aromatic sulfone polyesters which can be converted directly into fibrillated products without the necessity of forming staple fibers as an intermediate step.

Further objects will become apparent from the following detailed description of the invention.

We have discovered that nylon blended with an aromatic sulfone polyester, preferably, a polyester derived from 4,4'-dicarboxydiphenyl sulfone and an aromatic dihydroxy compound, produces a blend which is especially adapted for preparing composite filaments that fibrillate readily. The fibrillated product is suitable for weaving into fabric having good tactile properties and relatively high bulk.

Illustrative aliphatic and aromatic sulfone polyesters which may be employed in the invention and means for the preparation thereof as disclosed in U.S. Pats. 2,805,-213, and 3,228,913, as well as in patents referred to therein, and in copending U.S. application Ser. No. 641,-129, filed May 25, 1967.

U.S. Pat. No. 3,228,913 is directed to polymeric esters having high molecular weights of 4,4'-dicarboxydiphenylsulfone with glycols having two hydroxy groups on the terminal carbon atoms of a straight chain composed of at least five carbon atoms, or polymeric mixed esters of 4,4'-dicarboxydiphenylsulfone with a mixture of those glycols or a mixture of one or more of those glycols with diethylene glycol (a glycol ether) or with a saturated aliphatic glycol having a straight carbon chain of less than five carbon atoms, with the two hydroxyl groups on terminal carbon atoms of the chain, in which mixture at least 50 mol percent consists of the saturated aliphatic glycol having at least five carbon atoms in the chain.

The dicarboxylic acid 4,4'-dicarboxydiphenylsulfone may be prepared by heating toluene with concentrated sulfuric acid or one of its halogenated derivatives, such as chlorosulfuric acid, and oxidizing with dilute permanganate solution or a solution of chromic acid in acetic acid the resulting 4,4'-dimethyldiphenylsulfone to 4,4'-dicarboxydiphenylsulfone. This sulfone acid may be esterfied by reaction with a lower aliphatic alcohol, such as methanol or ethanol, and the ester of the lower alcohol transesterified by reaction with a glycol or glycol ether to form the corresponding glycol or glycol ether ester of 4,4'-dicarboxydiphenylsulfone. Also, these glycol esters may be prepared by direct esterification of 4,4'-dicarboxydiphenylsulfone by reaction with a glycol or glycol ether.

The esters of 4,4'-dicarboxydiphenylsulfone with saturated aliphatic glycols having two hydroxy groups on the terminal carbon atoms of a straight chain of at least five carbon atoms may be heated to polymerize the glycol ethers until the resulting polymeric esters have intrinsic viscosities of at least 0.4 at 25° C. In making the polyester compositions a part of the higher, five carbon atom glycol which is reacted to form the esters of 4,4'-dicarboxydiphenylsulfone may be substituted by diethylene glycol or a saturated aliphatic glycol containing less than five carbon atoms in the chain without seriously impairing the characteristics of the high molecular weight polyesters which make them peculiarly suitable for fiber production. In some cases, the polyester characteristics may be advantageously modified or their production cheapened in this manner. However, at least 50 mol percent of the glycol or glycol and glycol ether mixture used in preparing the polyesters is composed of the saturated aliphatic glycols of higher molecular weight, i.e., those containing at least five carbon atoms.

The glycol esters of 4,4'-dicarboxydiphenylsulfone, produced by a particular method involving transesterification and a two-stage polymerization treatment, in the second of which stages a partially polymerized ester is heated in finely divided solid condition, produces polymers of high intrinsic viscosity which are especially suitable for spinning into fibers and stretching the fibers to molecularly orient them.

In this procedure an alcohol diester of 4,4'-dicarboxydiphenylsulfone, preferably a diester of a low boiling, saturated aliphatic monohydroxy alcohol, such as the dimethyl or diethyl ester, is mixed with one or more saturated aliphatic glycols containing at least 5 carbon atoms or with a mixture of such glycols and a glycol or glycol ether containing less than five carbon atoms in the molecules, in which mixture the higher glycol (five or more carbon atoms in the molecules) constitutes at least 50 mol percent of the total glycol and glycol ether present. The mixture contains a ratio of at least 1.3 mols of total glycol and glycol ether for every one mol of the diester of the sulfone acid. It is better to use a higher ratio, preferably more than 2 mols of total glycol and glycol ether for every one mol of the diester. Using the higher ratios, the molecular weights of the polymers prepared from the resulting glycol or mixed glycol-glycol ether esters of the sulfone acid are increased and better fibers are produced therefrom. The alcohol of the diester is one which boils at a temperature below the boiling point of the glycol and glycol ether employed for transesterification of the diester. Aliphatic, cycloaliphatic or aromatic alcohols may be employed for this transesterification so long as the boiling point of the alcohol bears the above relationship to the boiling point of the glycol and glycol ether to be converted into the desired ester. A transesterification catalyst also is incorporated in the reaction mixture. Numerous catalysts for transesterification of esters are known and they may be used in carrying out the foregoing step. Preferred catalysts are salts of zinc and particularly the silicofluoride, fluoride, fluoroborate, cyanide, acetate, or borate of zinc. Magnesium carbonate is a good catalyst for this transesterification.

The reaction mixture of diester, glycol or glycol and glycol ether and catalyst is heated in an oxygen-free atmosphere at temperatures at which alcohol displaced from its ester by the glycol or glycol ether, is vaporized and is distilled from the reaction mixture. When this alcohol ceases to distil over the ester interchange and formation of the desired glycol or mixed glycol-glycol ether ester of the dicarboxydiphenylsulfone has been substantially completed.

The particular composition of the glycol or glycol-glycol ether esters formed will depend upon the amount of glycol and glycol ether mixed with the diester. With more than 2 mols total glycol and glycol ether added per mol of the alcohol ester the product is essentially diglycol or mixed diesters of the sulfone acid with two or more glycols or glycols and glycol ether. As less total glycol and glycol ether is used, the product contains more of the mixed esters of glycol or of glycol and glycol ether and alcohol. Thus, with the 1.3 mols glycol or glycol and glycol ether per mol of the alcohol ester of the sulfone acid, the transesterification product is largely the monoglycol ester or glycol-glycol ether mono-ester. By employing a mixture of two or more different glycols, mixed glycol esters of the sulfone acid are produced.

While the above indicated method is the preferred method for making the glycol esters, they may be prepared in other manners. For example, the 4,4'-dicarboxydiphenylsulfone may be directly esterified by heating the acid with the saturated aliphatic glycols or glycols and glycol ether. This esterification is promoted by having present in the reaction mixture an esterification catalyst, of which many are well known to the art.

The preferred esters for use in preparing polymers by the methods described below are prepared from glycols containing 5 to 10 carbon atoms in the molecule, with or without ethylene glycol or diethylene glycol also present in limited proportions.

When heated, the above-described glycol esters polymerize to form the polymers of our invention with evolution of glycol or of glycol and glycol ether or a lower boiling alcohol. The mixed alcohol-glycol or alcohol-glycol-ether esters polymerize when heated to form essentially the same polymers as are formed by heating the diesters of the glycols or glycol-ether. These polymeric esters are characterized by containing recurring chain units having the structure:

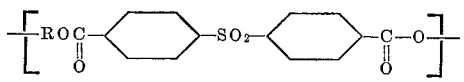

where R represents the divalent radicals —$(CH_2)_n$— and —$(CH_2)_2O(CH_2)_2$, where $n$ is an integer greater than one which may have different numerical values in different chain units in a given polymer; and in any given polymer at least 50% of the radical R consist of $(CH_2)_n$ in which the value of $n$ is at least 5, preferably 5 to 10.

When mixtures of higher and lower glycols or diethylene glycol and alkyl esters of 4,4'-dicarboxydiphenylsulfone are heated and the mixed esters formed are further heated to form our polymeric esters, the resulting polymers will have this composition when the higher (at least five carbon atom) glycol constitutes at least 50 mol percent of the mixture.

In the preferred polymers, one end valence of the polymer chain is satisfied by a hydroxyl group attached to the R radical and the other by a —$(CH_2)_nOH$ or —$(CH_2)_2O(CH_2)_2OH$ group. On the other hand, one or both of the end valences of the polymer chain may be satisfied by a chain terminating aliphatic, cycloaliphatic or aromatic radical, such as the methyl, cyclohexyl or benzyl radicals.

The polymeric diesters and the polymeric mixed diesters of 4,4'-dicarboxydiphenylsulfone with one or a plurality of the glycols of the homologous series ethylene glycol through and including decamethylene glycol have been found particularly useful.

In preparing the polymers of the above-described glycol esters of 4,4'-dicarboxydiphenylsulfone, the reaction product of the transesterification is advantageously used directly, without purification, although the same procedure may be employed for polymerization of the purified esters. In the preferred procedure the reaction product of the transesterification step described above is further heated under reduced pressure below atmospheric to cause partial polymerization of the dicarboxydiphenylsulfone ester. This heating is best carried out under reduced pressure in the order of 1 mm. Hg and is at temperatures at which glycol or glycol and glycol ether or lower aliphatic alcohol is vaporized from a melt of the reaction mixture. The heating of the molten mixture preferably is continued for about two to about four hours or (alternatively) until the intrinsic viscosity of the partially polymerized glycol ester is of the order of 0.2. All intrinsic viscosities given are the values calculated from the viscosities of an 0.1–1% solution of the ether polymer dissolved in a solvent consisting of a 60/40 mixture by weight of phenol and s-tetrachloroethane and of the solvent itself, the viscosities of solution and solvent being measured at 25° C. The following equation is employed for these calculations:

$$Ni = \frac{\log_e nr}{C}$$

where $nr$ is the viscosity of the polymer solution divided by the viscosity of the solvent, and C is the concentration in grams per 100 cc. of the polymer solution.

At the end of the foregoing first stage of polymerizing the glycol ester by heating it in a molten state, the reaction mixture containing the partially polymerized ester is converted into small solid particles. Preferably, it is cooled to solidify it and the solid is finely ground. The solid particles are then heated in a second polymerization stage to temperatures below their melting point under reduced pressures and in an atmosphere of nitrogen or other inert, dry, oxygen-free gas. This heating of the solid polymer is preferably carried out at temperatures of about 30° to about 50° C. below the melting point of the partially polymerized material being heated, and under reduced pressures of the order of 0.001 mm. Hg. By heating this solid the ester is further polymerized to form a product of higher molecular weight and higher intrinsic viscosity. As the heating of the solid is prolonged, the intrinsic viscosity increases up to a maximum. Further heating is not desirable, since it may lead to a decomposition of the polymer and decrease in intrinsic viscosity. For production of fibers, the solid is heated until the intrinsic viscosity of the polymer is increased to about 0.4 or higher, preferably to 0.9 or higher.

U.S. Pat. No. 2,805,213 teaches that p,p'-sulfonyl dibenzoic acid or its esters or its acid chloride plus a cyclic aliphatic dicarboxylic acid or diester thereof or its acid chloride can be condensed with a polymethylene glycol (or such a glycol combined with an aliphatic ether glycol) to produce a new kind of linear interpolyester. This patent also teaches a process for preparing an interpolyester comprising (a) condensing about 10 mole proportions of a dicarboxylic diphenyl sulfone compound having the formula

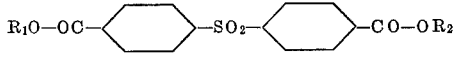

wherein $R_1$ and $R_2$ each represent a substituent selected from the group consisting of a hydrogen atom and an alkyl radical containing from 1 to 6 carbon atoms, plus from about 1 to about 30 mole proportions of a cyclic aliphatic dicarboxylic compound selected from the group consisting of the ortho-, meta- and para-isomers of cyclohexane dicarboxylic acid, the ortho-, meta- and para-isomers of 1,4-endomethylenecyclohexane dicarboxylic acid and the alkyl monoesters and alkyl diesters of all of these acids wherein the alkyl radicals contain from 1 to 6 carbon atoms, (b) with a dioxy compound selected from the group consisting of polymethylene glycols containing from 2 to 10 carbon atoms and lower alkanoic mono- and diesters of these glycols wherein the alkanoic groups contain from 2 to 4 carbon atoms, the dioxy compound being employed in such a proportion that there is at least an equivalent amount of oxy substituents in proportion to the carboxy substituents in the overall combination of the dicarboxylic compounds and the dioxy compounds, (c) in the presence of an ester-interchange catalyst selected from the group consisting of the alkali metals, the alkaline earth metals, the oxides of these two groups of metals, the alkoxides containing from 1 to 6 carbon atoms of these two groups of metals, the carbonates, and borates of these two groups of metals, lead oxide, and compounds having the following formulas:

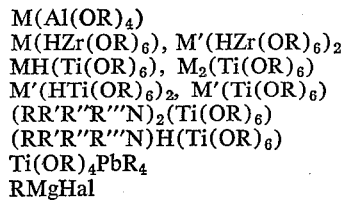

wherein M represents an alkali metal, M' represents an alkaline earth metal selected from the group consisting of magnesium, calcium and strontium, R represents an alkyl group containing from 1 to 6 carbon atoms, R' and R'' and R''' each represents a member of the group consisting of R and an aryl group of the benzene series containing from 6 to 9 carbon atoms and Hal represents a halogen atom, (d) at an elevated temperature, (e) the condensation being conducted in an inert atmosphere, and (f) the latter part of the condensation being conducted at a very low pressure of the inert atmosphere.

Advantageously, the dioxy compound can be employed in such a proportion that there are from about 1.2 to about 3 oxy substituents in proportion to the carboxy substituents in the overall combination of the dicarboxylic compounds and the dioxy compounds. More advantageously, the range of proportions is from 1.25 to about 2.0. Advantageously, the low pressure referred to under (f) is less than 15 mm. of Hg pressure. Advantageously, the elevated temperature employed during the earlier part of the condensation is about 170°; the elevated temperature during the latter part can be as high as about 300° C.

Advantageously, the dioxy compound is a polymethylene glycol having the formula:

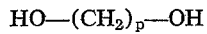

wherein $p$ is a positive integer of from 2 to 10.

The dioxy compounds defined above may not actually contain any free hydroxy radicals since they may be in esterified form as indicated. Each dicarboxylic compound is considered as containing two carboxy radicals as that term is employed in the definition of the process as described above; either $R_1$ or $R_2$ may be alkyl radicals or hydrogen atoms.

Furthermore, this covers a process as defined above wherein esters of the two dicarboxylic compounds are formed by a preliminary step comprising condensing free p,p'-sulfonyl dibenzoic acid and/or the free cyclic aliphatic acid with a polymethylene glycol which is employed in the proportion set forth under (b), at an elevated temperature, after which preliminary step the condensing agent which is defined under (c) is added and the condensation is completed as defined under (d), (e) and (f). Advantageously the elevated temperature employed during the preliminary step is substantially that at which reflux conditions subsist; however, higher and lower temperatures can also be employed. Advantageously, as indicated above the polymethylene-glycol is employed in such a proportion that there are from about 1.2 to about 3 oxy substituents in the overall proportion to the carboxy substituents in the overall combination of the free acid dicarboxylic compounds and the polymethylene glycol.

The polymethylene glycols (dioxy compounds) which can be employed to form highly polymeric linear polyesters include the following examples: ethylene glycol, trimethylene glycol, tetramethylene glycol, hexamethylene glycol, decamethylene glycol, etc. As indicated above, mono and diesters of these glycols can also be employed. Thus, the acetates, propionates and butyrates are examples of such esters. Ether glycols can be employed in admixture with polymethylene glycols. Examples of ether glycols include diethylene glycol, triethylene glycol, etc. When mixtures of polymethylene glycols and ether glycols are employed, it is generally preferable to employ a major proportion of the polymethylene glycol in order to obtain higher melting linear polyesters. The high melting characteristic also is dependent upon the amount of cyclic aliphatic dicarboxylic compound present in the interpolyester and the chain length of the glycol employed. Higher proportions of the cyclic aliphatic dicarboxylic compound lower the melting and softening temperatures of the interpolyesters. The same effect is created by employing a longer chain (higher carbon content) polymethylene glycol. For example, when a 10 carbon atom glycol is employed, the amount of aliphatic ether glycol used should preferably be not more than about 10-20 mole percent; whereas, when a 2-4 carbon atom glycol is employed the amount of ether glycol can be considerably higher (up to about 50 mole percent of the total quantity of dioxy compounds employed). When the proportion of cyclic aliphatic dicarboxylic compound is rather low and no ether glycol is employed, it is advantageous to employ polymethylene glycols containing at least 4 carbon atoms.

The advantageous ratio of p,p'-sulfonyldibenzoic acid or diester to the cyclic aliphatic dicarboxylic acid or diester will depend upon the type of product desired. As the mole percent of the latter modifying acid in the polyester is increased, the melting point of the product is lowered. When short chain glycols such as ethylene glycol and tetramethylene glycol are used, it is usually preferable to employ from 1 to 3 moles of the cyclic aliphatic dicarboxylic acid or diester for each mole of p,p'-sulfonyldibenzoic diester in order to keep the melting point of the product below its decomposition temperature. When higher glycols such as pentamethylene, hexamethylene, and octamethylene glycol are used, from about 1 to about 7 or 8 moles of the cyclic aliphatic dicarboxylic compound (e.g., the diester) can be employed for each ten moles of p,p'-sulfonyl dibenzoic compound.

The novel interpolyesters may contain as constituents thereof small percentages of the m,m'- and/or the m,p'-isomers of the p,p'-sulfonyl dibenzoic compound without significant deleterious effect on the properties of these interpolyesters. In fact, when the interpolyester is to be employed for purposes other than for making fibers, substantial quantities of these isomers can be employed with some advantageous results, especially as regards increasing the softening temperature range.

The ester-interchange catalytic condensing agents which can advantageously be employed have been described above. From about 0.005% to about 0.2% of such catalysts based on the weight of the reactants being condensed can be employed. Higher or lower percentages can also be employed. Generally from about 0.01% to about 0.06% of the catalytic condensing agent can be advantageously employed based on the weight of the various diesters being condensed. Other ester-interchange catalysts can also be employed in lieu of those set forth above.

The temperature at which polyesterification can be conducted is dependent upon the specific reactants involved in any given reaction. In general, the reaction mixture can be heated at from about 170° to about 220° C. for from approximately two to three hours in an inert atmosphere (e.g., nitrogen or hydrogen); the mixture can then be heated at from about 220°–240° to about 280–300° C. in the same atmosphere for approximately ½ to 2 hours. Finally, the pressure can be greatly reduced to form a vacuum (less than about 15 mm. of Hg pressure but preferably on the order of less than 1 mm. of Hg pressure) while the temperature is maintained in substantially the same range (about 240°–300° C.); these conditions are advantageously maintained for approximately 4 to 6 additional hours. This final phase is advantageously carried out with agitation under the high vacuum in order to facilitate the escape of volatile products from the highly viscous melt. The described conditions can be varied considerably depending upon the degree of polyesterification desired, the ultimate properties sought, the stability of the polyester being produced, and the use for which the product is intended. Thus, the extent of the replacement of the sulfonyl dibenzoic acid or diesters with the cyclic aliphatic dicarboxylic acid or diesters necessitates variations in these conditions of temperature, pressure and time periods required.

It has been found that the type of catalyst used has an important bearing upon the properties of the final product. Although most of the catalysts cited in the prior art may be used, it has been found that certain novel catalysts give superior results. The aluminum and titanium alkoxide complexes described in copending applications filed on Apr. 4, 1954 are especially valuable for the preparation of the polyesters described here. Moreover, novel tin catalysts have also been found to be especially effective. See Caldwell applications, Ser. No. 313,972, now Pat. No. 2,720,502, Caldwell and Reynolds Ser. No. 313,077, now Pat. No. 2,720,506, Wellman and Caldwell Ser. No. 313,074, now Pat. No. 2,720,504, Ser. No. 313,075, now Pat. No. 2,727,881 and Ser. No. 313,076, now Pat. No. 2,720,505 and Wellman Ser. No. 313,073 for a description of especially advantageous catalytic condensing agents.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It is important to exclude oxygen and moisture at all stages of the condensation reaction. Inert atmospheres which can be advantageously employed include nitrogen, hydrogen, helium, etc. Substantially anhydrous reactants can also be advantageously employed although this is not essential, especially if any water is removed in the earlier stages of the condensation.

Examples of the various dicarboxylic compounds in the form of diesters which can be employed in accordance with the process of this invention include the ethyl, propyl, n-butyl, sec-butyl, isopropyl, sec-amyl, n-hexyl, 10-hydroxydecyl, 5-hydroxyamyl, 12-hydroxydodecyl, 2-hydroxyethyl, etc., diesters of either p,p'-sulfonyl dibenzoic acid or any of the cyclic aliphatic dicarboxylic acids described above. When the novel catalytic condensating agents described hereinabove and in copending applications referred to herein are employed, the simple alkyl esters of these various dicarboxylic acids can be advantageously employed, whereas if other catalysts known to the prior art are employed, the condensation will not proceed as rapidly or as effectively although satisfactory results can be obtained.

The cyclic aliphatic dicarboxylic acids encompassed within the scope of this invention can be selected from the group consisting of the ortho-meta- and para-isomers of cyclohexane dicarboxylic acid, the ortho-, meta- and para-isomers of 1,4-endomethylenecyclohexane dicarboxylic acid and the alkyl monoesters and alkyl diesters of all of these acids wherein the alkyl radicals contain from 1 to 6 carbon atoms.

Examples of these acids and their esters include: 1,4-endomethylenecyclohexane - 1,4 - dicarboxylic acid; cyclohexane - 1,3 - dicarboxylic acid; cyclohexane-1,2-dicarboxylic acid; the di-n-butyl ester of cyclohexane-1,4-dicarboxylic acid; the sec-amyl diester of cyclohexane-1,2-dicarboxylic acid; the isopropyl diester of 1,4-endomethylenecyclohexane-1,3-dicarboxylic acid, etc.

These novel interpolyesters may contain as constituents thereof small percentages of the m,m' and/or the m,p'-isomers of the p,p'-sulfonyl dibenzoic compound without significant deleterious effect on the properties of these interpolyesters. In fact, when the interpolyester is to be employed for purposes other than for making fibers, substantial quantities of these isomers can be employed with some advantageous results, especially as regards increasing the softening temperature range. The same effect is produced when homologs of p,p'-sulfonyl dibenzoic acid are incorporated into the materials being condensed to prepare these interpolyesters. If homologs are employed they are most advantageously those of p,p'-sulfonyl dibenzoic acid, e.g., m,m'-dimethyl-p,p'-sulfonyl dibenzoic acid, o-ethyl-p,p'-sulfonyl dibenzoic acid, m-methyl-o-propyl-p,p'-sulfonyl dibenzoic acid, etc. Small proportions of various diesters of such isomers and homologs can be employed in substitution for a corresponding quantity of the diester of p,p'-sulfonyl dibenzoic acid when the interpolyester product is not intended to be used in the preparation of fibers.

The linear polyesters can be advantageously prepared by first forming a polymer as described hereinabove except that the final period of heating is cut short so as to yield a relatively low molecular weight polymer. This intermediate polymer can then be comminuted to form a powder. This powder can then be advantageously further polymerized by heating in an inert atmosphere or in a vacuum at a temperature of from about 170° C. up to about 2°–5° C. below the melting point of the powdered intermediate polymer. By using this solid phase build-up the highly polymeric polyesters produced have intrinsic viscosities that are exceptionally high. U.S. Pat. Nos. 2,-650,213, 2,647,885, 2,173,374 and others disclose various techniques of carrying out the solid phase build-up of exceptionally high polymers.

The products are linear interpolyesters which possess favorable flow characteristics over a temperature differential (or range) of about 5° to 20° C., a low modulus of elasticity and which contain in the interpolyester configuration a ratio of about 10 of one of the following repeating units:

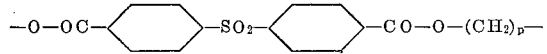

to each 1 to about 30 of one of the following repeating units:

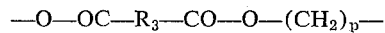

wherein the repeating units are connected by ester linkages, p is defined above and R represents a divalent cyclic aliphatic radical selected from the group consisting of the ortho-, meta-, and para-isomers of cyclohexylene radicals and the ortho-, meta- and para-isomers of 1,4-endomethylenecyclohexylene radicals.

When the ratio of the repeating units is, respectively, from about 10:1 to about 10:2 these interpolyesters are especially valuable for being spun into fibers which can be cold drawn to from about 3 to 6 times their originally spun length and heat set thereby developing strong, elastic properties distinguished by a high degree of reversible extensibility.

The above described interpolyesters can also have either one or both of the two types of repeating units depicted above replaced in part, respectively, by repeating units derived from ether glycols in lieu of the polymethylene glycols.

Copending application Ser. No. 641,129 relates to sulfone polyesters having recurring units of the formula:

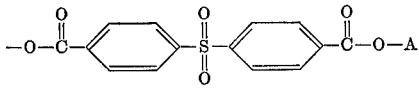

wherein A represents a divalent aromatic radical containing one or more phenylene or substituted phenylene groups. This application teaches that linear high molecular weight aromatic polyesters derived from 4,4'-dichlorocarbonyldiphenylsulfone and aromatic dihydroxy compounds can be prepared readily at moderate temperatures and normal pressures by reacting them in equimolar amounts in a catalyzed solution under anhydrous conditions.

According to the process of that invention, 4,4'-dichlorocarbonyldiphenylsulfone, alone, or in admixture with other dicarboxylic acid chlorides, is reacted in a catalyzed solution with an aromatic dihydroxy reactant. The mixture is reacted at least until evolution of hydrogen chloride has ceased. The polymer product is then isolated. By varying the conditions of time and temperature of reaction and concentrations and types of starting materials, a wide range of polyesters, copolyesters and terpolyesters can be prepared having determinable molecular weights and properties.

Equimolar amounts of the 4,4'-dichlorocarbonyldiphenylsulfone reactant and the dihydroxy reactant are preferred in our process since the presence of an excess of either reactant will act as a terminator for the polymerization reaction resulting in the formation of low molecular weight polyesters.

The solvent should be a solvent for both the 4,4'-dichlorocarbonyldiphenylsulfone reactant and the dihydroxy reactant and preferably for the resultant polyester, although this is not required. In general, aromatic hydrocarbons and halogenated aromatic hydrocarbons are solvents which may be employed in the process of the invention, including benzene, toluene, o-xylene, m-xylene, p-cymene, diphenylmethane, 1,3,5-triethylbenzene, chlorobenzene, o-dichlorobenzene, 1,2,4-trichlorobenzene, and the like. In general, the use of higher boiling solvents will result in the formation of high molecular weight polymers.

Effective catalysts include certain metals and their salts such as magnesium metal, zinc metal, aluminum metal and cuprous chloride. The catalysts which are useful are quite specific since similar metals and salts including nickel metal, copper metal and zinc chloride were found to be ineffective as catalysts. Additional metals and metallic salts which are effective as catalysts in the process of the present invention can be determined by one skilled in the art. The catalyst concentration can be from 0.01 to 2.00 wt. percent. In the absence of an effective catalyst, only low molecular weight polyesters are obtained. Particularly outstanding results were obtained with magnesium metal catalyst.

The polymerization reaction proceeds readily at the reflux temperature of the reaction mixture which depends upon the boiling point of the solvent employed during polymerization. In general, the rate of polymerization will increase at higher temperatures of reaction.

The time required for the formation of high molecular weight polyester will vary depending upon the temperature of the reaction, the purity of the reactants and the choice of catalysts. The reactants and the solvent must be essentially free from impurities and water which cause degradative side reactions and chain termination and prevent the formation of high molecular weight polymer. Increasing the time of reaction increases the molecular weight of the resultant polymer with accompanying increases in glass transition temperature, flow temperature, and decomposition temperature.

4,4'-dichlorocarbonyldiphenylsulfone can be prepared by reaction of 4,4'-dicarboxydiphenylsulfone with a solution of phosphorous pentachloride and phosphorous oxychloride. The excess oxychloride is distilled off, and the product can be isolated by distillation or recrystallization from a suitable solvent.

Acyl chloride derivatives of other dicarboxylic acids can be added as part of the acid chloride reactant. Such dicarboxylic acids include aliphatic dicarboxylic acids such as oxalic acid, malonic acid, succinic acid, adipic acid, suberic acid, α-ethyl suberic acid, sebacic acid, dodecanedioic acid, α,α-diethyl adipic acid and the like. Substituted aliphatic acids such as ortho-, meta- or para-phenylene diacetic acid and o-phenylene acetic-β-propionic acid, aromatic dicarboxylic acids such as phthalic acid, isophthalic acid, terephthalic acid, 4,4'-diphenyldicarboxylic acid, 4,4'-diphenyletherdicarboxylic acid, 4,4'-diphenylmethanedicarboxylic acid, 2,2-(4,4'-dicarboxydiphenyl)propane, 4,4'-dicarboxydiphenyldichloromethane, and the like.

The aromatic dihydroxy compounds suitable for use in the invention include aromatic diols and bisphenols wherein each reactive hydroxy radical is directly attached to a benzene ring. Suitable compounds, for example, include 1,2-dihydroxybenzene, 1,3-dihydroxybenzene, 1,4-dihydroxybenzene, 2-chloro-1,4-dihydroxybenzene, bis(4-hydroxyphenyl)dimethylmethane, 1,4 - bis(p-hydroxycumyl)benzene, 4,4-bis(hydroxyphenyl)sulfone, 2,2-bis(4'-hydroxyphenyl) - 1,1a,3,3a,4,5,5,5a,5b,6 - decachlorooctahydro-1,3,4-metheno-2H-cyclobuta[cd]pentalene and its derivatives having the formula

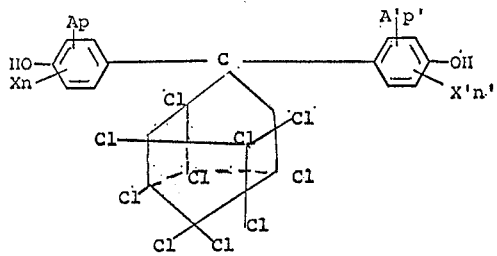

wherein each node represents a tetravalent carbon atom, A, A', X and X' represent hydrogen substitutes in a position ortho to the phenolic hydroxy group, A and A' are alkyl radicals having from 1 to 3 carbon atoms, X and X' are halogens independently selected from the group consisting of chlorine and bromine; $n$ and $n'$ are integers from 0 to 2; $p$ and $p'$ are integers from 0 to 2; the sum of $n$ and $p$ is less than 3 and the sum of $n'$ and $p'$ is less than 3.

These compounds, hereinafter referred to as "Kepone" bisphenols, can be prepared by reacting a $C_{10}Cl_{10}O$ ketone (1,1a,4,4a,4,5,5,5a,5b,6 - decachlorooctahydro- 1,3,4 -metheno-2H-cyclobuta[cd]-pentalene-2-one) or a hydrate thereof with the corresponding phenol compound having a free para position at an elevated temperature in the presence of an acid catalyst. "Kepone" is a trademark of Allied Chemical Corporation for said $C_{10}Cl_{10}O$ ketone. A suitable process for preparing such "Kepone" bisphenols employing a boron trifluoride catalyst is disclosed in U.S. Pat. No. 3,370,086; and a process employing a sulfonic acid catalyst is disclosed in U.S. Pat. No. 3,420,894.

Mixtures of more than one aromatic dihydroxy compound can be employed, including mixtures containing for example 1,3-dihydroxybenzene and 1,4-dihydroxybenzene or an aliphatic dihydroxy compound can be substituted in part for the aromatic dihydroxy compound. Suitable aliphatic dihydroxy compounds include the polymethylene glycols having from 2 to 10 carbon atoms such as ethylene glycol, 1,5-pentanediol, 1,10-decanediol and other glycols of this series, branched chain glycols such as 2,2-dimethyl-1,3-propanediol, 2-methyl-1,5-pentanediol and the like and carbocyclic glycols such as 1,4-di(hydroxyethyl)benzene, 1,4-bis(2'-hydroxyethyl)-2,5-dichlorobenzene and the like. Derivatives of any of the above glycols bearing one or more substituents which will not interfere with the formation of high molecular weight linear polyesters, such as nitro-substituted glycols, can also be employed.

The polymer product can be isolated in any convenient manner such as will be known to one skilled in the art. One convenient method is to filter off the catalyst and pour the reaction mixture into a nonsolvent for the polymer. The precipitated polymer can be further purified by washing and drying to remove solvent.

The term "sulfone polyester," as used herein, contemplates also copolyesters which may be prepared for example by replacing part of the aliphatic or aromatic sulfone dicarboxylic acid reactant by various dicarboxylic acids, including aliphatic diacids such as oxalic acid, succinic acid, adipic acid, suberic acid, α-ethyl suberic acid, sebacic acid, dodecanedioic acid, α,α-diethyl adipic acid and the like; substituted aliphatic acids such as ortho-, meta-, or paraphenylene diacetic acid and o-phenylene acetic-β-propionic acid; and aromatic dicarboxylic acids such as phthalic acid, isophthalic acid, terephthalic acid, 4,4'-diphenyldicarboxylic acid, 4,4'-diphenylether-dicarboxylic acid, 4,4'-diphenylmethanedicarboxylic acid, 2,2'-bis(4-dicarboxydiphenyl)propane and the like. At least about 10 mol percent of the dicarboxylic acid reactant will be an aromatic or aliphatic sulfon dicarboxylic acid in order to obtain significantly desirable properties in the blends.

The term "polyamide," as used herein, is intended to include polyamides and copolyamides which contain less than 30 percent of a modifying constituent, whether it be a second acid, a second amine, a lactam such as caprolactam, etc. These copolyamides may contain other linkages, such as ester groups, but at least 70 percent of the linking groups in the polymer must be amide groups and the amide polymer must be of sufficiently high molecular weight and possess other properties compatible to fiber forming. The polyamides and copolyamides may be aliphatic, aliphatic-aromatic, heterocyclic, etc. Those prepared from aliphatic-diamines have been found to operate most satisfactorily and they are preferred. Specific examples of diamines include ethylene diamine, propylene diamine, butylene diamine, tetramethylene diamine, pentamethylene diamine, hexamethylene diamine, paraxylylene diamine, p-phenylene-diamine, etc.

Any of the dibasic acids or their derivatives which are capable of forming polyamides by reaction with a diamine may be utilized as constituents of the polyamide. Suitable dibasic acids which may be used are: oxalic, malonic, succinic, glutaric, adipic, pimelic, suberic, azelaic, sebacic, terephthalic, isophthalic, hexahydroterephthalic, cyclohexylene dicarboxylic and the like.

The blends of the polyesters as described above with a nylon can be prepared by heating a mixture of from about 20 to about 50 percent by weight, preferably from about 25 to about 40 percent by weight of the above-described polyesters or copolyesters with the nylon to form a melt-blend suitable for spinning of fibers. Although temperatures ranging from about the melting point of the highest melting component to near the decomposition temperature of the polymers may be used, temperatures from about 250° C. to about 320° C. are preferably employed. The nylon and the sulfone polyester, as described above, can be dry-blended before melting, or the blending process can be carried out in the melt. Melt-blending can be carried out conveniently by stirring or extrusion. Since it is desirable to have a low moisture content in the blend to prevent degradation of the polyamide, blending is preferably carried out in a dry, inert atmosphere.

Alternatively, the blends can be prepared in solution by dissolving the nylon and the polyester in a suitable solvent and precipitating a mixture of the polymers either by evaporating the solvent or by adding a nonsolvent to the solution.

The blends can be formed into sheets which may be slit into strips and then fibrillated or the melt-blend may be spun into monofilaments. The monofilaments can be drawn into fibers by the well-known techniques utilized for nylon. Typically, the blends of the invention are melted, mixed and formed into a monofilament in a single-step process in an extruder. Thereafter, the monofilament or slit strips may be fibrillated by suitable means, such as by the technique described in the copending patent application of D. C. Prevorsek et al. [P.D. No. 7000-495], Ser. No. 680,678, filed on even date herewith, wherein a monofilament is fibrillated in two stages, or by mechanically increasing the monofilament surface area by vigorous blending action and then opening the fibrils of the structure by passing it through a zone of high velocity air jet.

The physical properties of the fiber can be modified by varying the amounts of the polyesters present and also by varying the composition of the particular polyester additive. For example, blending a nylon with a polyester having a lower reduced viscosity than the nylon produces a blend having an intermediate viscosity, depending upon the proportion of polyester added. The addition of certain polyesters can improve the tensile properties of nylon; the addition of certain polyesters can decrease the set developed by nylon when exposed to an applied stress. Although the exact effect on nylon properties when a particular polyester is added is not entirely predictable, the variations in nylon properties can be determined by routine experimentation by one skilled in the art.

The invention may be illustrated further by the following examples, but it is to be understood that the invention is not to be limited to the details disclosed therein. In the examples, parts are by weight.

EXAMPLE 1

(A) Preparation of aromatic sulfone polyesters derived from 1,4-bis(p-hydroxycumyl)benzene A mixture of 52 g. (0.15 mol) of 1,4-bis(p-hydroxycumyl)benzene, 25.8 g. (0.075 mol) of 4,4' - dichlorocarbonyldiphenylsulfone, 13.7 g. (0.075 mol) of adipoyl chloride, 0.35 g. of magnesium powder (Baker and Adamson Code No. 1900) and 700 ml. of freshly distilled o-dichlorobenzene was placed in a 1000-ml. round-bottom flask equipped with a condenser, agitator, and gas inlet. The mixture was heated to reflux (180° C.) whereupon hydrogen chloride evolved. Heating was continued under an atmosphere of nitrogen for 17 hours to yield a slightly brownish, clear viscous solution. This solution was filtered through glass wool and then allowed to cool, whereupon it was poured in portions of about 200 ml. into 1.5 liters of isopropanol in a Waring blender. Polymer precipitated, was filtered out, and then washed once in the bender with fresh isopropanol and then separated therefrom by filtration. It was then given an additional wash with 1000 ml. of refluxing isopropanol for ½ hour, filtered off and dried at reduced pressure at 80°–90° C. for about 17 hours. Obtained: 78 g. of dry copolymer having a reduced viscosity in m-cresol (0.52 g. per 100 ml. m-cresol at 25° C. of 0.96. The flow point observed in a capillary tube was 240°–280° C. The glass transition temperature found by differential thermal analysis was 161° C.

(B) Preparation of sulfone polyester-nylon 6 blends (1) 45 g. of polycaprolactam Plaskon nylon 8201 having a reduced viscosity in m-cresol of 1.8 and 30 g. of the sulfone polyester of part (A) were blended and dried under reduced pressure at a temperature of 80°–90° C. This dried blend was then extruded into a monofilament. This was done using a Reifenhauser extruder model S–013 having a ½-inch diameter screw with a length-to-diameter ratio of 24:1. Extruder temperature controls were set at 620°, 650° and 650° F. An ⅛-inch diameter monofilament was extruded with a back pressure of about 2000 p.s.i. This monofilament was quenched in water and pelletized and the pellets dried for about 3 days under reduced pressure at a temperature of 80°–90° C. 54 g. of a polyblend containing 60 percent nylon 6 and 40 percent sulfone copolyester having a reduced viscosity of 1.73 in m-cresol was thereby obtained.

(2) The foregoing procedure was repeated using 75 g. of polycaprolactam Plaskon nylon 8201 and 25 g. of the sulfone copolyester. There was obtained 90 g. of polyblend containing 75 percent nylon 6 and 25 percent sulfone polyester, said polyblend having a reduced viscosity of 1.88.

(C) Spinning and drawing of sulfone polyester-nylon blends (1) The polyblend containing 60% nylon 6 and 40% of the sulfone copolyester, prepared as shown in (B(1)), was melt spun in a ram extruder using a 17-mil diameter die. The unit was flushed with nitrogen before and during charging. The melt temperature was 275° C., die temperature 280° C. The monofilament was taken up at a speed of 16 ft./min. and quenched in air and ice water. Twenty-mil filament thus obtained was then drawn by passing it around a driven feed roll operating at a surface speed of 3 ft./min., then passing it over a hot block heated to a temperature of 175° C. and then fed to a driven take-up roll operating at a surface speed of 9 ft./min. The resulting filament had a smooth surface with no signs of fibrillation.

A sample of the filament drawn as above, i.e., at a draw ratio of 3:1, was then taken and drawn over rollers submerged in a silicone oil bath at 190° C. with a feed speed of 3 ft./min. and take-up speed of 5.4 ft./min. to give a total draw ratio of 5.4:1. The resulting filament had a smooth surface with no signs of fibrillation.

Another sample of the 3:1 drawn filament was drawn through the silicone oil bath at 195° C. with a feed speed of 3 ft./min. and take-up speed of 5.9 ft./min. The filament flattened out at the submerged rollers and separated into continuous fibrils. However, some breaks occurred, and the test was repeated with a take-up speed of 5.4 ft./min. The filament separated into continuous fibrils which contained no broken ends and ran substantially the entire length of the sample.

(2) The polyblend containing 75% nylon 6 and 25% of the sulfone polyester, prepared as shown in (B(2)) was melt spun in a gas rheometer using a 19-mil diameter die. The melt temperature was 275° C., die temperature 280° C. Monofilament was taken up at a speed of 33 ft./min. and quenched in air and ice water. Twenty-four mil monofilament thus obtained was then drawn at a ratio of 3:1 over a block heated at 175° C. The drawn product had a smooth surface with no signs of fibrillation.

A sample of this 3:1 drawn filament was then drawn again over a hot block at 190° C. for a total draw ratio of 5.2:1. The resulting filament had a smooth surface with no signs of fibrillation.

Another sample of this 3:1 drawn filament was drawn again through the silicone oil bath at 195° C. for a total draw ratio of 5.2:1. The filament separated into many continuous fibrils.

EXAMPLE 2

(A) Preparation of aromatic sulfone polyester derived from bisphenol A

A mixture of 250.8 g. of bisphenol A recrystallized from toluene, 121.0 g. of adipoyl chloride, 150.7 g. of 4,4'-dichlorocarbonyldiphenylsulfone, 2.0 g. of magnesium powder (Baker and Adamson Code No. 1900) and 3500 ml. of freshly distilled o-dichlorobenzene was placed in a 5-liter, three-necked, round-bottom flask equipped with a condenser, agitator and gas inlet. The mixture was heated to reflux whereupon hydrogen chloride evolved. Heating was continued under an atmosphere of nitrogen for 16½ hours. The resultant solution was filtered through glass wool and the filtered solution poured into 2 liters of isopropanol, affording a dough-like mass. This was treated with more isopropanol in a Waring Blendor and the product isolated by filtration. 370 grams of copolymer was thus obtained having a glass transition temperature, as measured by differential thermal analysis, of 140°–143° C., a reduced viscosity in m-cresol of 1.21 and a flow point observed in a capillary tube of 260°–280° C.

(B) Preparation of sulfone polyester-nylon 6 blend and filament 700 grams of Plaskon nylon 8201 having a reduced viscosity in m-cresol of 1.8 and 300 g. of the bisphenol A-sulfone polyester (Example (2(A)) were blended and the blend dried overnight at 120° C. and a pressure of 0.06 mm. of mercury. This dried blend was then extruded into monofilament in a Sterling extruder using a 50-mil die, a die pressure of 2900 p.s.i., and water quench. Fifty-mil diameter filament was obtained at a take-up speed of 46 ft./min.

(C) Drawing of sulfone polyester-nylon 6 filament

The 50-mil, 70% nylon 6–30% bisphenol A-sulfone polyester filament was drawn at a ratio of 3:1 over rollers submerged in a silicone oil bath at 175° C. The drawn filament was smooth with no sign of fibrillation. This drawn filament was then drawn over rollers submerged in a silicone oil bath at 190° C. for a total draw ratio of 5.75:1. The sample had small fibrils sticking out after this maximum draw. When the sample was pulled, the entire filament fibrillated.

We claim:
1. A method of preparing a fibrillated filament comprising the steps of (a) preparing a melt-blend of a fiber-forming polyamide and from about 20 to about 50 percent by weight based on the weight of the blend of a sulfone polyester; (b) fabricating a unitary strand from said blend and; (c) subjecting said strand to mechanical flexing sufficient to convert said unitary strand into a yarn having a multifibril structure.

2. The method of claim 1 wherein said fiber-forming polyamide is nylon 6.

3. The method of claim 2 wherein said polyester is the reaction product of 1,4 - bis(p - hydroxycumyl)benzene, 4,4'-dicarboxydiphenylsulfone and adipic acid.

4. The method of claim 2 wherein said polyester is the reaction product of bisphenol A, 4,4' - dicarboxydiphenylsulfone and adipic acid.

5. A fibrillated filament prepared in accordance with the process of claim 1.

References Cited

UNITED STATES PATENTS

| | | | |
|---|---|---|---|
| 3,117,362 | 1/1964 | Breen | 57—140 |
| 3,181,224 | 5/1965 | Tanner | 28—72 |
| 3,350,488 | 10/1967 | Breen | 264—171 |
| 3,382,305 | 5/1968 | Breen | 260—857 |
| 3,418,200 | 12/1968 | Tanner | 161—177 |

PAUL LIEBERMAN, Primary Examiner

U.S. Cl. X.R.

260—75, 78; 264—210